US009559976B2

United States Patent
Peterson et al.

(10) Patent No.: US 9,559,976 B2
(45) Date of Patent: Jan. 31, 2017

(54) INSERTING USER TARGETED WEB RESOURCES INTO BROWSER NAVIGATION MEMORY

(71) Applicant: LENOVO (Singapore) PTE, LTD., New Tech Park (SG)

(72) Inventors: Nathan J. Peterson, Durham, NC (US); John Carl Mese, Cary, NC (US); Russell Speight VanBlon, Raleigh, NC (US); Rod D. Waltermann, Rougemont, NC (US); Arnold S. Weksler, Raleigh, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 367 days.

(21) Appl. No.: 13/645,244

(22) Filed: Oct. 4, 2012

(65) Prior Publication Data

US 2014/0101315 A1    Apr. 10, 2014

(51) Int. Cl.
*H04L 12/56* (2006.01)
*H04L 12/911* (2013.01)
*H04L 29/08* (2006.01)

(52) U.S. Cl.
CPC .............. *H04L 47/70* (2013.01); *H04L 67/20* (2013.01)

(58) Field of Classification Search
None
See application file for complete search history.

(56) References Cited

U.S. PATENT DOCUMENTS

| 8,078,626 B1* | 12/2011 | Whitt et al. ................. 707/751 |
| 2005/0132297 A1* | 6/2005 | Milic-Frayling . G06F 17/30873 715/745 |
| 2009/0293018 A1* | 11/2009 | Wilson et al. ............... 715/811 |
| 2010/0082674 A1* | 4/2010 | Yiu et al. ..................... 707/780 |
| 2010/0161587 A1* | 6/2010 | Sullivan ....................... 707/709 |
| 2011/0055357 A1* | 3/2011 | Kakuta et al. ............... 709/219 |
| 2011/0202522 A1* | 8/2011 | Ciemiewicz ...... G06F 17/30867 707/711 |

* cited by examiner

*Primary Examiner* — Chris Parry
*Assistant Examiner* — Stephen Houlihan
(74) *Attorney, Agent, or Firm* — Kunzler Law Group (57) ABSTRACT

An apparatus for inserting user targeted web resources into browser navigation memory includes a storage device storing machine-readable code and a processor executing the machine-readable code. The machine-readable code includes a determination module determining whether a web resource is a user targeted web resource. The web resource is loaded in a web browser. The machine-readable code includes an insertion module inserting a record of the web resource into navigation memory of the web browser in response to the determination module determining that the web resource is a user targeted web resource.

10 Claims, 7 Drawing Sheets

INSERTING USER TARGETED WEB RESOURCES INTO BROWSER NAVIGATION MEMORY

FIELD

The subject matter disclosed herein relates to browser navigation memory and more particularly relates to inserting user targeted web resources into browser navigation memory.

BACKGROUND

Description of the Related Art

Many browsers include forward and backward navigation functions that allow a user to navigate to web resources stored in a record of visited web resources. These forward and backward navigation functions are frequently used by the user.

A user may typically navigate from a current web resource to a web resource visited previously by clicking on a backward navigation function. A user may also typically navigate to a web resource visited subsequent to the current web resource by clicking on a forward navigation function. Browsers often maintain an exact history of web resources in the record of visited web resources, adding a record of each web resource loaded by the browser.

BRIEF SUMMARY

Based on the foregoing discussion, the inventors have recognized a need for an apparatus, system, and method for inserting user targeted web resources into browser navigation memory. Beneficially, such an apparatus, system, and method would allow forward and backward navigation functions to navigate to user targeted web resources.

The embodiments of the present subject matter have been developed in response to the present state of the art, and in particular, in response to the problems and needs in the art that have not yet been fully solved by currently available browsers or browser plug-ins. Accordingly, the embodiments have been developed to provide a method, apparatus, and system for inserting user targeted web resources into browser navigation memory.

An apparatus is provided that, in one embodiment, includes a storage device storing machine-readable code and a processor executing the machine-readable code. In one embodiment the machine-readable code includes a determination module determining whether a web resource is a user targeted web resource. The web resource may be loaded in a web browser. The machine-readable code, in one embodiment, includes an insertion module inserting a record of the web resource into navigation memory of the web browser in response to the determination module determining that the web resource is a user targeted web resource.

A method is also presented, that in the disclosed embodiments, substantially includes the steps to carry out the functions presented above with respect to the operation of the described apparatus. In one embodiment, the method includes determining whether a web resource is a user-targeted web resource. The web resource may be loaded in a web browser. In one embodiment, the method includes inserting a record of the web resource into navigation memory of the web browser in response to determining that the web resource is a user-targeted web resource.

A computer program product including a storage device storing machine readable code executed by a processor to perform operations is also presented. In one embodiment, the operations include determining whether a web resource is a user-targeted web resource. The web resource may be loaded in a web browser. In one embodiment, the operations include inserting a record of the web resource into navigation memory of the web browser in response to determining that the web resource is a user-targeted web resource.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of the embodiments as set forth hereinafter.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more storage devices storing machine readable code. The storage devices may be tangible, non-transitory, and/or non-transmission.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in machine readable code and/or software for execution by various types of processors. An identified module of machine readable code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of machine readable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more storage devices.

Any combination of one or more machine readable medium may be utilized. The machine readable storage medium may be a machine readable signal medium or a storage device. The machine readable medium may be a storage device storing the machine readable code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this file, a computer readable storage medium may be any tangible medium that can contain, or store a program for use by or in connection with an instruction execution system, apparatus, or device.

A machine readable signal medium may include a propagated data signal with machine readable code embodied therein, for example, in baseband or as part of a carrier wave. Such a propagated signal may take any of a variety of forms, including, but not limited to, electro-magnetic, optical, or any suitable combination thereof. A machine readable signal medium may be any storage device that is not a computer readable storage medium and that can communicate, propagate, or transport a program for use by or in connection with an instruction execution system, apparatus, or device. Machine readable code embodied on a storage device may be transmitted using any appropriate medium, including but not limited to wireless, wireline, optical fiber cable, Radio Frequency (RF), etc., or any suitable combination of the foregoing.

Machine readable code for carrying out operations for embodiments may be written in any combination of one or more programming languages, including an object oriented programming language such as Java, Smalltalk, C++ or the like and conventional procedural programming languages, such as the "C" programming language or similar programming languages. The machine readable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by machine readable code. These machine readable code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The machine readable code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The machine readable code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and machine readable code.

Figure 1:
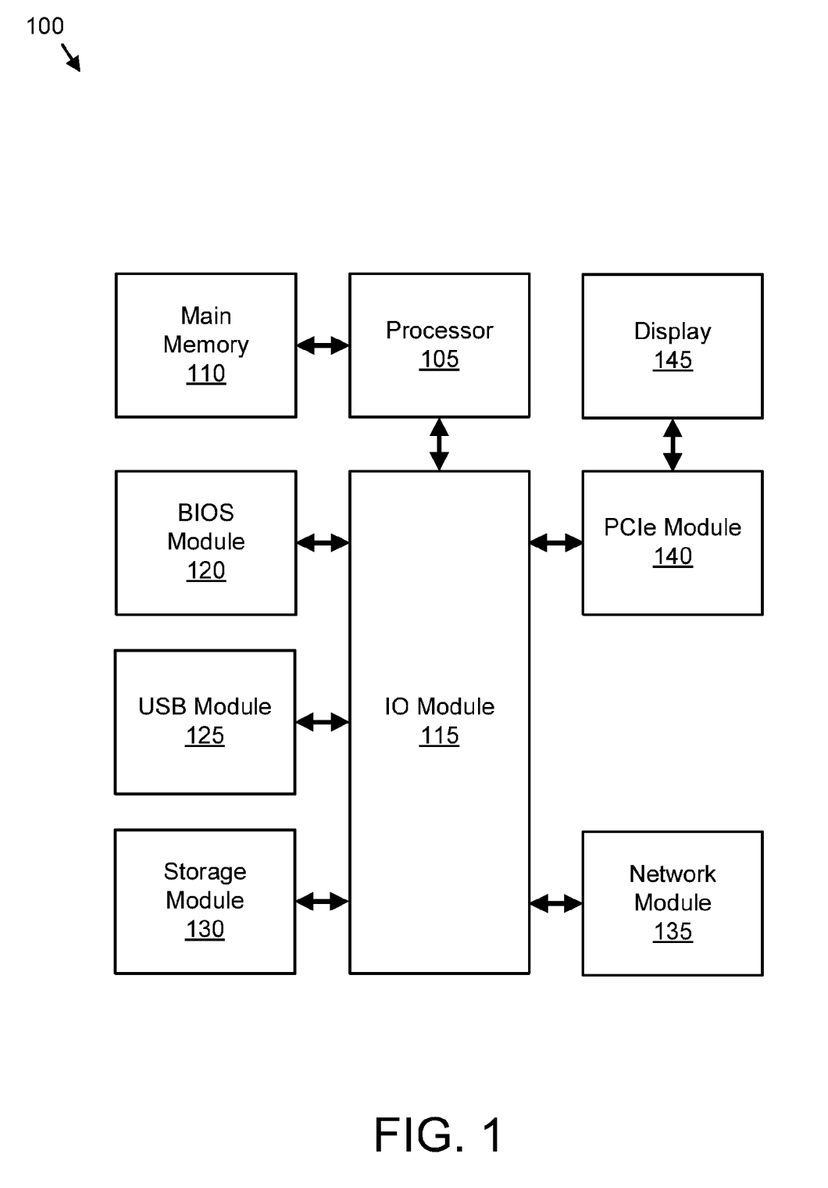
FIG. 1 is a schematic block diagram illustrating one embodiment of an information handling device in accordance with the present subject matter.

FIG. 1 is a schematic block diagram illustrating one embodiment of an information handling device 100. The information handling device 100 includes a processor 105, a memory 110, an IO module 115, a basic input/output system ("BIOS") module 120, a universal serial bus ("USB") module 125, a storage module 130, a network module 135, a peripheral component interconnect express ("PCIe") module 140, and a display 145. One of skill in the art will recognize that other configurations of an information handling device 100 or multiple information handling devices 100 may be employed with the embodiments described herein.

The processor 105, memory 110, the IO module 115, the BIOS module 120, the USB module 125, the storage module 130, the network module 135, the PCIe module 140, referred to herein as components, may be fabricated of semiconductor gates on one or more semiconductor substrates. Each semiconductor substrate may be packaged in one or more semiconductor devices mounted on circuit cards. Connections between the components may be through semiconductor metal layers, substrate-to-substrate wiring, circuit card traces, and/or wires connecting the semiconductor devices.

The memory 110 stores computer readable programs. The processor 105 executes the computer readable programs as is well known to those skilled in the art. The computer readable programs may be tangibly stored in the storage module 130. The storage module 130 may comprise at least one Solid State Device ("SSD"). In addition, the storage module 130 may include a hard disk drive, an optical storage device, a holographic storage device, a micromechanical storage device, or the like.

The processor 105 may include integrated cache to reduce the average time to access memory 115. The integrated cache may store copies of instructions and data from the most frequently used memory 110 locations. The processor 105 may communicate with the memory 110.

In addition, the processor 105 may communicate with the IO module 115. The IO module 115 may support and communicate with the BIOS module 120, the network module 135, the PCIe module 140, and the storage module 130.

The PCIe module 140 may communicate with the IO module 115 for transferring data or power to peripheral devices. The PCIe module 140 may include a PCIe bus for attaching the peripheral devices. The PCIe bus can logically connect several peripheral devices over the same set of connections. The peripherals may be selected from a printer, a scanner, or the like. The PCIe module 140 may also comprise an expansion card as is well known to those skilled in the art. In one embodiment, the PCIe module 140 is in communication with a display. Specifically, in one embodiment, the PCIe module comprises a PCIe expansion card in communication with the display. In one embodiment, the PCIe expansion card comprises a PCIe Mini Card. The display 145 may be a cathode ray tube ("CRT"), a liquid crystal display ("LCD") monitor, or the like.

The BIOS module 120 may communicate instructions through the IO module 115 to boot the information handling device 100, so that computer readable software instructions stored on the storage module 130 can load, execute, and assume control of the information handling device 100. The BIOS module 120 may comprise a coded program embedded on a chipset that recognizes and controls various devices that make up the information handling device 100. The BIOS module 120 may refer to various approaches to providing a firmware interface for booting an information handling device 100, including traditional BIOS, unified extensible firmware interface (UEFI), Open Firmware, and others. The BIOS module 120, in one embodiment, includes a storage device that stores the relevant instructions for booting. The storage device may be a solid state storage device, such as Flash memory. The BIOS module 120 may be a solid state storage device with relevant code that is attached to a motherboard of the information handling device 100.

The network module 135 may communicate with the IO module 115 to allow the information handling device 100 to communicate with other devices over a network. The devices may include routers, bridges, computers, printers, and the like. The USB module 125 may communicate with one or more USB compatible devices over a USB bus.

Figure 2:
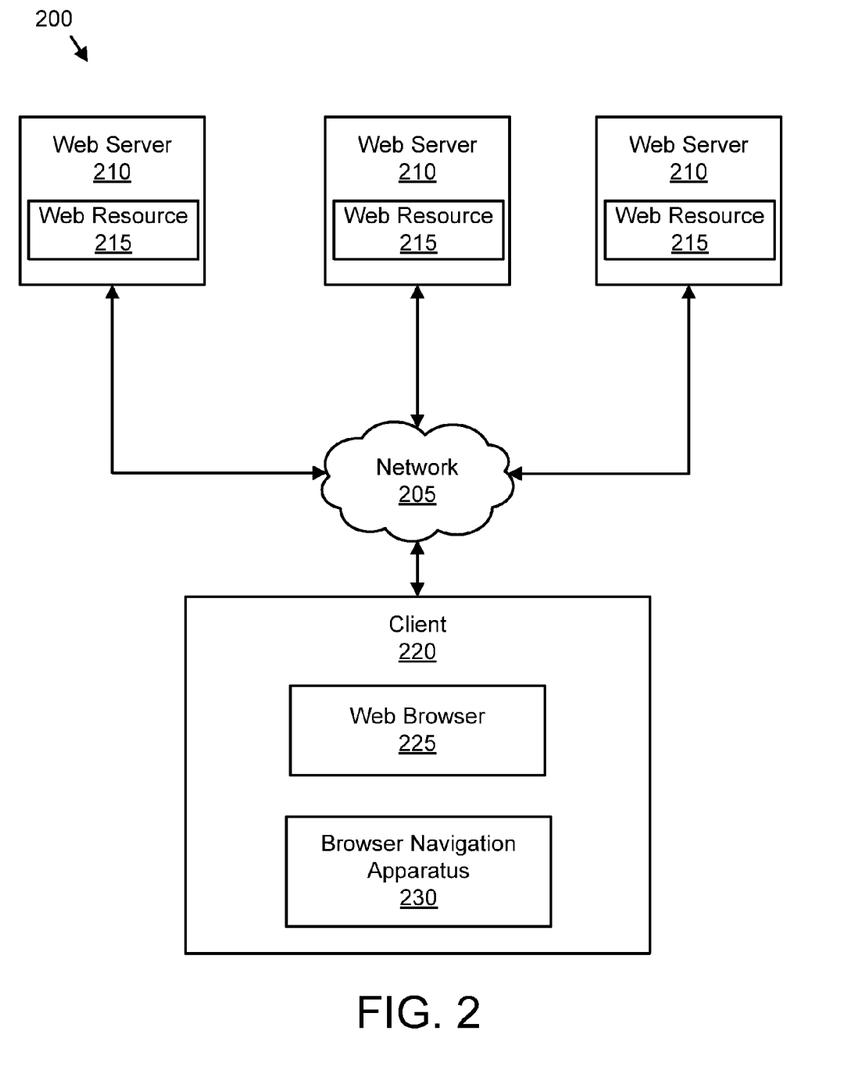
FIG. 2 is a schematic block diagram illustrating one embodiment of a system for inserting user targeted web resources into browser navigation memory in accordance with the present subject matter.

FIG. 2 depicts one embodiment of a system 200 for inserting user targeted web resources into browser navigation memory. The system 200 includes a plurality of web servers 210 in communication with a network 205. The system 200 also includes a client 220 in communication with the network 205. The client 220 includes a web browser 225 and a browser navigation apparatus 230.

The plurality of web servers 210 host a plurality of web resources 215. Each web resource 215 may be a web page, an image, a file, a document, script, a Uniform Resource Locator (URL) redirect, and the like. Each web page may include HyperText Markup Language (HTML), text, images, Flash animations, JavaScript code, and the like, as is known in the art. Furthermore, each web resource 215 may be represented by a URL, which is a character string used to identify and locate a web resource 215 on the network 205, such as the Internet. Although three web servers 210 are depicted, one of skill in the art realizes that any suitable number of web servers 210 may host web resources 215 available for access by clients 205 over a network 205. Likewise, a single web server 210 may host multiple web resources 215.

The network 205 may be embodied as a global communications network such as the Internet, a Local Area Network ("LAN"), multiple LANs communicating over the internet, a Wireless Local Area Network ("WLAN"), a mobile telecommunications network such as a 3G or 4G network, or any other suitable communications network.

The client 220 communicates with one or more of the web servers 210 through the network 205. The client 220 may be embodied as an information handling device having memory, a storage device storing computer readable programs, and a processor that executes the computer readable programs as is known to those skilled in the art. The client 220 may comprise an embodiment of the information handling device 100 depicted in FIG. 1. The client 220 may be a portable or handheld device such as a personal desktop assistant ("PDA"), a tablet computer, a slate computer, an e-Book reader, a mobile phone, a smartphone, and the like. In one embodiment, the client 220 may be a desktop computer, a portable computer, a laptop computer, a server, a mainframe computer, and the like.

The client 220 accesses and downloads the web resources 215 using the web browser 225 as is known in the art. The web browser 225 may be a software application for accessing, downloading, and displaying web resources 215. The web browser 225 may locate and access a particular web resource 215 using the URL for the web resource 215. URL redirects may be among web resources 215 the web browser 225 accesses. A URL redirect may include one or more of a web page, a script file, a web server extension or the like that automatically redirects (forwards) the web browser 225 to a web resource 215 under a different URL.

In one embodiment, the web browser 225 includes forward and backward navigation functions that allow a user to navigate from a current web resource 215 to a web resource 215 visited previously by clicking on a backward navigation function. A user may also typically navigate to a web resource 215 visited subsequent to the current web resource by clicking on a forward navigation function. For example, if a browser leaves a first web resource 215 and loads a second web resource 215, the user may return to the first web resource 215 by selecting the backward navigation function. Similarly, once the user has returned to the first web resource 215, the user may return to the second web resource 215 by clicking on the forward navigation function.

Conventional web browsers typically maintain an exact history of web resources in the record of visited web resources, adding a record of each web resource visited by the browser. Consequently, when a user loads a URL redirect into the web browser (which subsequently forwards the browser to a second URL), a conventional web browser would include a record of the URL redirect in navigation memory used by the forward and backward navigation functions. If the user selects the backward navigation function after having loaded the URL redirect, the web browser may return to the URL redirect, which then forwards the browser again to the second URL. If the user then attempts to select the backward navigation function again, the process would repeat itself.

Therefore, the client 220 includes a browser navigation apparatus 230 which one or more of inserts and causes to be inserted user targeted web resources 215 into navigation memory and does not insert non-user targeted web resources 215, such as URL redirects or certain "pop-up" ads, into navigation memory. A user targeted web resource may be a web resource 215 associated with a user interaction, thus indicating a certain likelihood that the web resource 215 has one or more of been viewed by the user, targeted by the user, and purposefully loaded by the user into the web browser 225. Because URL redirects are not loaded into navigation memory, the user is spared the inconvenience of being redirected back to a particular web resource 215 when attempting to use the backward navigation function.

In one embodiment, all or a portion of the browser navigation apparatus 230 comprises a computer readable program stored and executed by an information handling device such as the client 220. The browser navigation apparatus 230 may be stored and executed on the client 220. Although the browser navigation apparatus 230 is depicted as being separate from the web browser 225, in other embodiments, all or a portion of the browser navigation apparatus 230 may be one or more of integrated with the web browser 225, included with the web browser 225, and a plug-in to the web browser 225.

Figure 3:
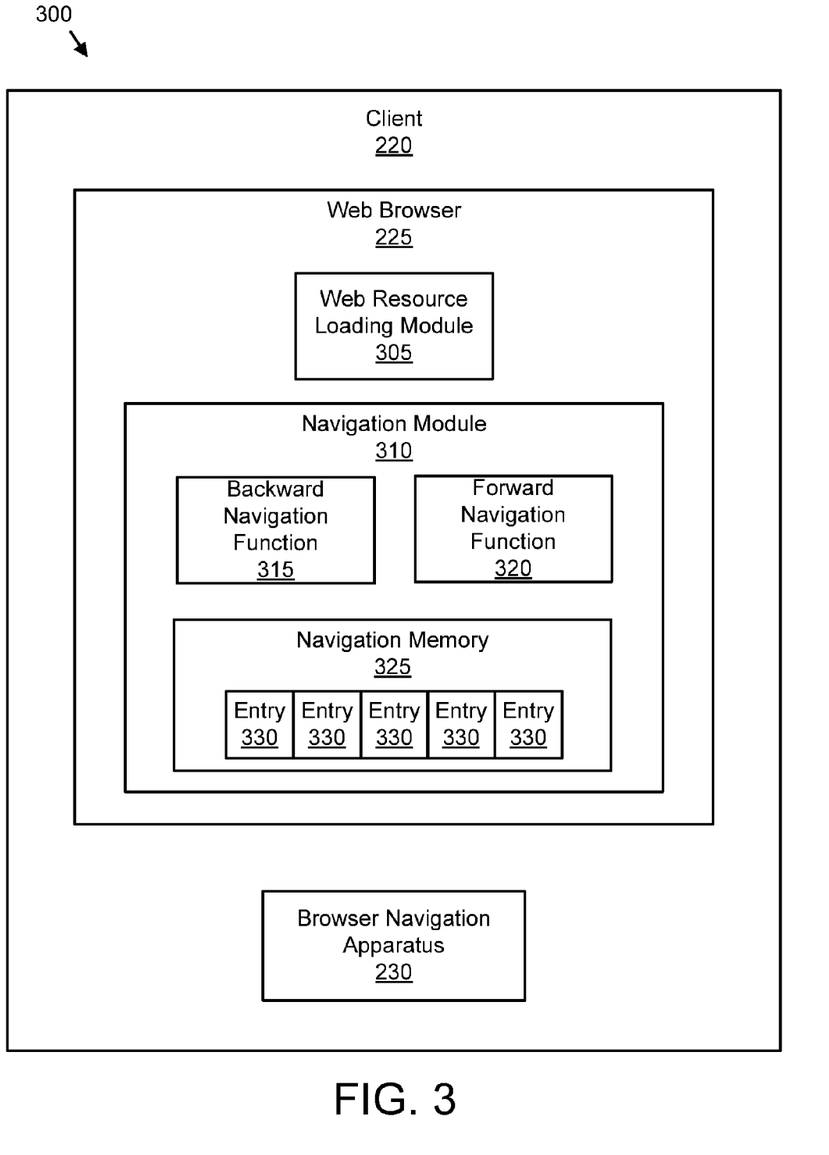
FIG. 3 is a schematic block diagram illustrating another embodiment of a system for inserting user targeted web resources into browser navigation memory in accordance with the present subject matter.

FIG. 3 depicts another embodiment of a system 300 for inserting user targeted web resources into browser navigation memory. The description of FIG. 3 refers to elements of FIG. 2, like numbers referring to like elements. The system 300 includes a client 220 with a web browser 225 and a browser navigation apparatus 230. The client 220, web browser 225, and browser navigation apparatus 230, may be similar to the like numbered elements described above in relation to FIG. 2. The web browser 225 includes a web resource loading module 305 and a navigation module 310 with backward and forward navigation functions 315, 320, and navigation memory 325 with a plurality of entries 330.

The web resource loading module 305 one or more of accesses, retrieves, and displays a web resource 215. The navigation module 310 manages navigation for the web browser 225 through entries representing web resources 215 and stored in the navigation memory 325.

The navigation memory 325 may be embodied as a data structure suitable to hold one or more entries 330 representing web resources 215. In one embodiment, the navigation memory 325 is a stack, a linked list, an Extended Markup Language (XML) file or other suitable data structure. In one embodiment, one or more of the entries 330 are URLs for web resources 215. The entries 330 may be in order according to navigation history with an entry 330 for an earlier visited URL in navigation order behind an entry 330 for a URL visited later in time. The navigation module 310 may, in response to detecting a selection of the backward navigation function 315, retrieve the last entry 330 from navigation memory 325 and cause the web browser 225 to load the web resource 215 corresponding to that entry 330. Likewise, the navigation module 310 may, in response to detecting a selection of the forward navigation function 320, retrieve a subsequent entry 330 (an entry 330 ahead of a current web resource 215) and cause the web browser 225 to load the web resource 215 corresponding to that entry. For example, if the browser currently has Web Resource B loaded, Web Resource A is a previous entry in the navigation memory 325, and Web Resource C is a subsequent entry in the navigation memory 325 (the user may have visited Web Resource C from Web Resource B then navigated back to Web Resource B), the navigation module 310 may load Web Resource A in response to a backward navigation function 315 and may load Web Resource B in response to the forward navigation function 320.

Although the browser navigation apparatus 230, as described above, is depicted as being separate from the web browser 225, in certain embodiments, the browser navigation apparatus 230 may be part of the web browser 225, such as part of the navigation module 310, or integrated with another suitable component. Furthermore, in certain embodiments, one or more of the web resource loading module 305 and the navigation module 310 may be part of the browser navigation apparatus 230.

Figure 4:
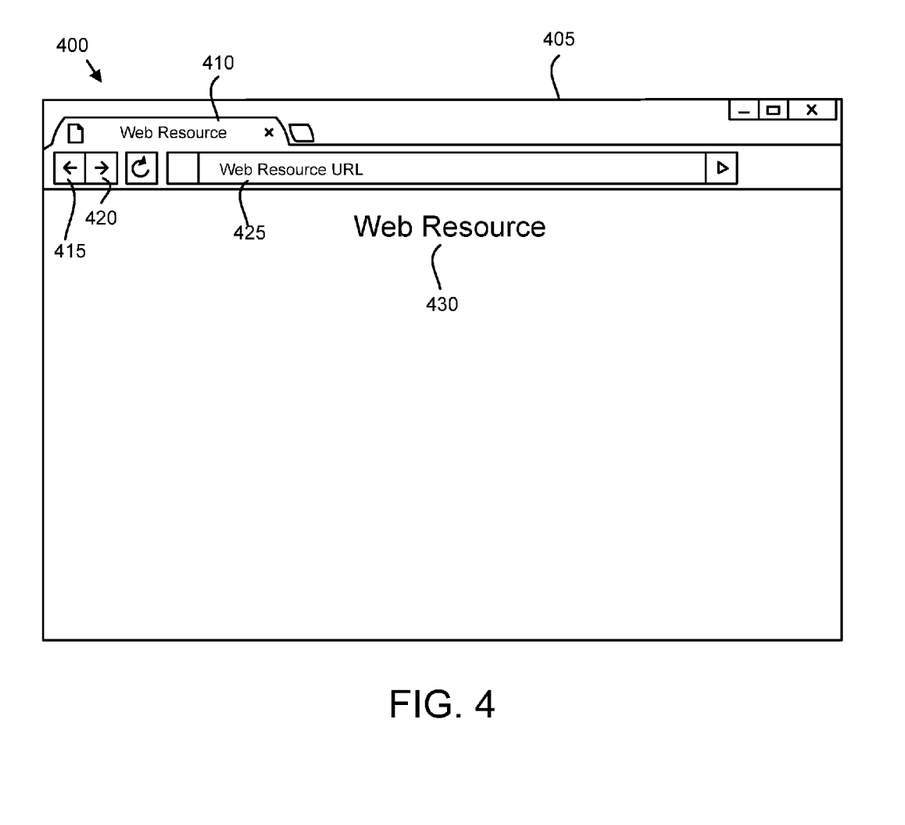
FIG. 4 is a schematic block diagram illustrating one embodiment of a browser user interface in accordance with the present subject matter.

FIG. 4 depicts one embodiment of a web browser user interface 400 in accordance with the present subject matter. The description of FIG. 4 refers to elements of FIGS. 2-3, like numbers referring to like elements. The web browser user interface 400 includes a window 405 with a tab 410 displaying a web resource 430. The tab 410 includes selectable buttons 415, 420 to activate the forward navigation function and the backward navigation function. Furthermore, the web browser user interface 400 includes an address bar 425 and displays the web resource 430. The web resource 430 may include text, graphics, video, and the like. As described above and in further detail below, the browser navigation apparatus 230 inserts user selected web resources in the navigation memory 325 to avoid unexpected results when a user attempts to use the navigation functions after the web browser 225 has loaded a URL redirect.

Figure 5:
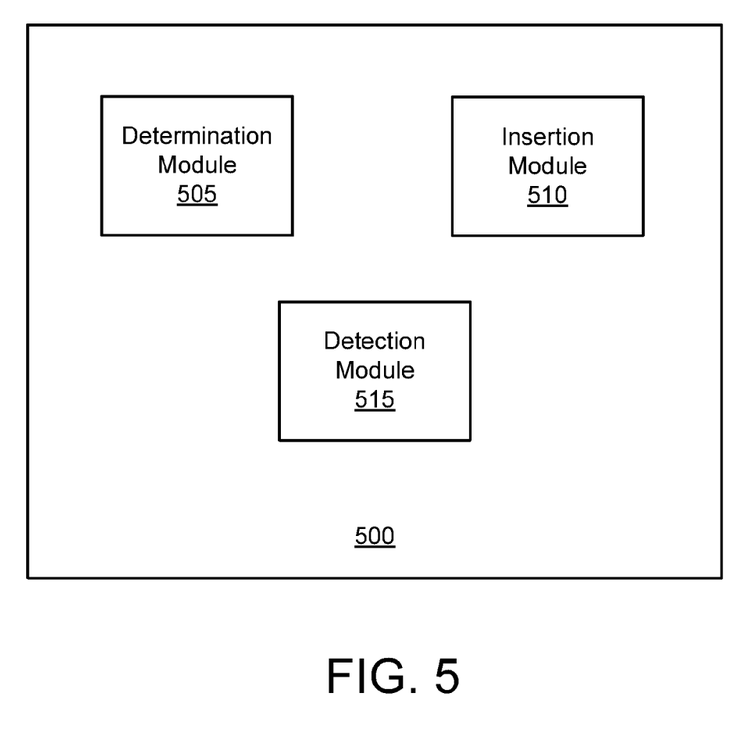
FIG. 5 is a schematic block diagram illustrating one embodiment of an apparatus for inserting user targeted web resources into browser navigation memory in accordance with the present subject matter.

FIG. 5 illustrates one embodiment of an apparatus 500 for inserting user targeted web resources into browser navigation memory 325. The apparatus 500 may comprise one embodiment of the browser navigation apparatus 230 depicted in one or more of FIG. 2 and FIG. 3. The apparatus 500 includes one or more of a determination module 505, an insertion module 510, and a detection module 515. The description of FIG. 5 refers to elements of FIGS. 2-4, like numbers referring to like elements.

The determination module 505, in one embodiment, determines whether a web resource 215 is a user targeted web resource. The web resource 215 may be loaded in a web browser 225 (e.g. the determination module 505 may determine whether a web resource 215 is a user targeted web resource while the web resource 215 is loaded in the web browser 225). A user targeted web resource may be a web resource 215 that is one or more of controllable, manageable, and viewable by a user. In one embodiment, a user targeted web resource is not a URL redirect (it does not redirect to another URL). In one embodiment, a user targeted web resource is a web resource 215 associated with a user interaction with the web browser 225 while the web resource 215 is loaded in the web browser 225. Likewise, in one embodiment, a non-user targeted web resource comprises one of a URL redirect and a web resource 215 that is not controllable, manageable, and viewable by a user. In one embodiment, determining whether the web resource 215 is a user targeted web resource also refers to determining whether a web resource 215 is a non-user targeted web resource such as a URL redirect or a web resource not associated with a user interaction.

In one embodiment, the determination module 505 determines that the web resource 215 is a user-targeted web resource in response to detecting a user interaction with the web browser 225 while the web resource 215 is loaded in the web browser 225. The user interaction may be one of a selection of a Uniform Resource Locator (URL) and a URL entry in an address bar 425 of the web browser 225. A selection of a URL may include a user clicking on a hyperlink for the URL, such as one appearing on the web resource 215. Furthermore, the URL entry in the address bar 425 may refer to a user selecting the address bar 425 and entering in a URL for navigation by the web browser 225. The determination module 505 may one of directly detect the URL entry or URL selection and receive an indication from the web browser 225 that the URL entry or URL selection has occurred. A user interaction may indicate that the currently loaded web resource 215 has a likelihood that it is not an automatic URL redirect.

In other embodiments, any suitable user interaction may be used. In one embodiment, any user interaction that triggers the web browser to load a web resource 215 in place of a current web resource 215 may be used by the determination module 505.

In one embodiment, the determination module 505 determines that the web resource 215 is a user targeted web resource in response to determining that the web resource 215 has been loaded by the web browser 225 for a predetermined period of time. Being loaded for a predetermined period of time may indicate that the web resource 215 is not a URL redirect which frequently redirects within a certain amount of time upon loading the URL redirect.

In one embodiment, the web browser 225 loads a next web resource 215 in response to the user interaction. For example, as described above, the user interaction may trigger the web browser 225 to load a next web resource 215, whether it be a URL that was directly entered in the address bar 425, a URL selected as a hyperlink on a web resource 215 (e.g. a web page), or the like.

The insertion module 510, in one embodiment, inserts a record of the web resource 215 into navigation memory 325 of the web browser 225 in response to the determination module 505 determining that the web resource 215 is a user targeted web resource. The record may be a URL for the web resource 215 included as an entry 330 in the navigation memory 325. In one embodiment, the insertion module 510 inserts the record of the web resource 215 into navigation memory 325 of the web browser 225 as the web resource 215 is being replaced by the web browser 225 by a next web resource 215. Specifically, in one embodiment, the insertion module 510 inserts the record of the web resource 215 into navigation memory 325 in response to a detection module 515 detecting the web browser 225 load the next web resource 215 as described below.

In one embodiment, the insertion module 510 skips inserting the record of the web resource 215 into navigation memory 325 in response to the determination module 505 determining the web resource 215 is not a user targeted web resource. In some embodiments, determining the web resource 215 is not a user targeted web resource may also include determining the web resource 215 is a non-user targeted web resource.

In a further embodiment, the skipped web resource 215 may include a URL redirect, a "pop-up" window, or the like. With a URL redirect, the web resource 215 may initiate a redirect to a next web resource 215 and the web browser 225 may load a next web resource 215 in response to the redirect. The next web resource 215 refers to a web resource 215 loaded subsequently. From the next web resource 215, the web browser 225 may skip the web resource 215 and return to a previous web resource 215 (a web resource visited prior to the skipped web resource 215) in response to a backward navigation function because a record for the skipped web resource 215 is absent from the navigation memory 325.

The detection module 515, in one embodiment, detects the web browser 225 load the next web resource 215. If the web resource 215 currently loaded in the web browser 225 is determined to be a user-targeted web resource, the detection module 515 may signal the insertion module 510 to insert a record of the web resource 215 into navigation memory 325 of the web browser 225 in response to the detection module 515 detecting the web browser 225 load the next web resource 215. Therefore, in one embodiment, records for user targeted web resources are inserted into navigation memory 325 in association with the next web resource 215 being loaded.

Figure 6:
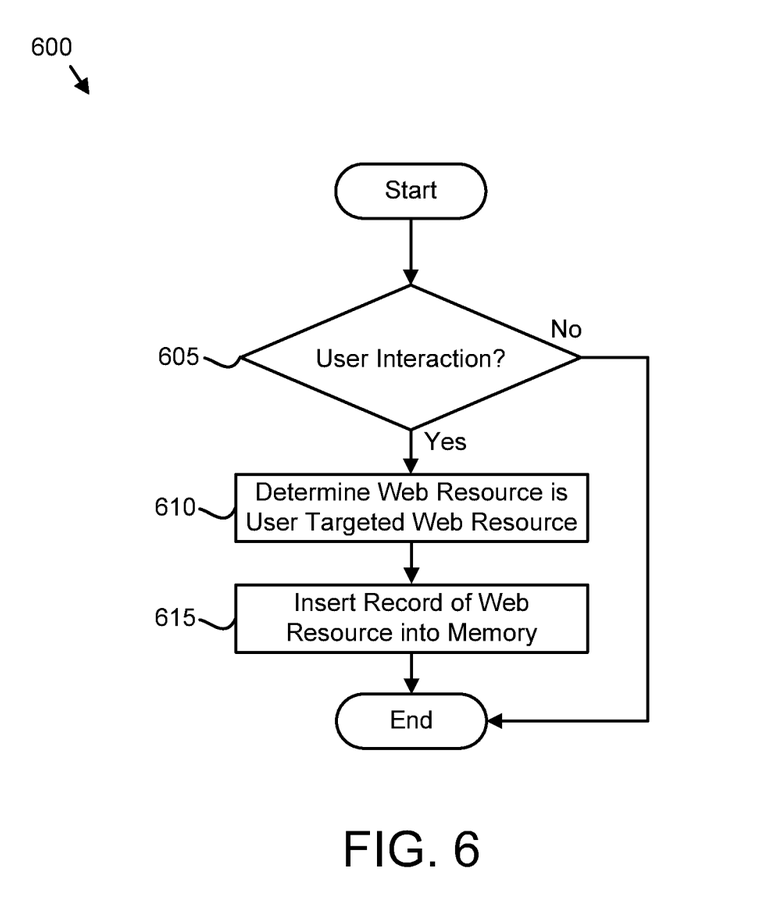
FIG. 6 is a schematic flow chart diagram illustrating one embodiment of a method for inserting user targeted web resources into browser navigation memory in accordance with the present subject matter.

FIG. 6 illustrates one embodiment of a method 600 for inserting user targeted web resources into browser navigation memory 325. The method 600 begins and the determination module 505 determines 605 whether there is a user interaction with a web browser 225 that has a loaded web resource 215. If the determination module 505 determines 605 there is no user interaction with the web browser 225, as may be the situation in which a URL redirect is loaded in the web browser 225, the method 600 ends.

If the determination module 505 determines 605 there is a user interaction with the web browser 225, the determination module 505 determines 610 that the web resource 215 is a user targeted web resource. The user interaction may include one of a selection of a Uniform Resource Locator (URL) and a URL entry in an address bar of the web browser 225. In one embodiment, the user interaction occurs while the web resource 215 is loaded in the web browser 225. In one embodiment, the web browser 225 loads another web resource 215 in response to the user interaction. Next, the insertion module 510 inserts 615 a record of the web resource 215 into navigation memory 325 of the web browser 225 and the method 600 ends.

Figure 7:
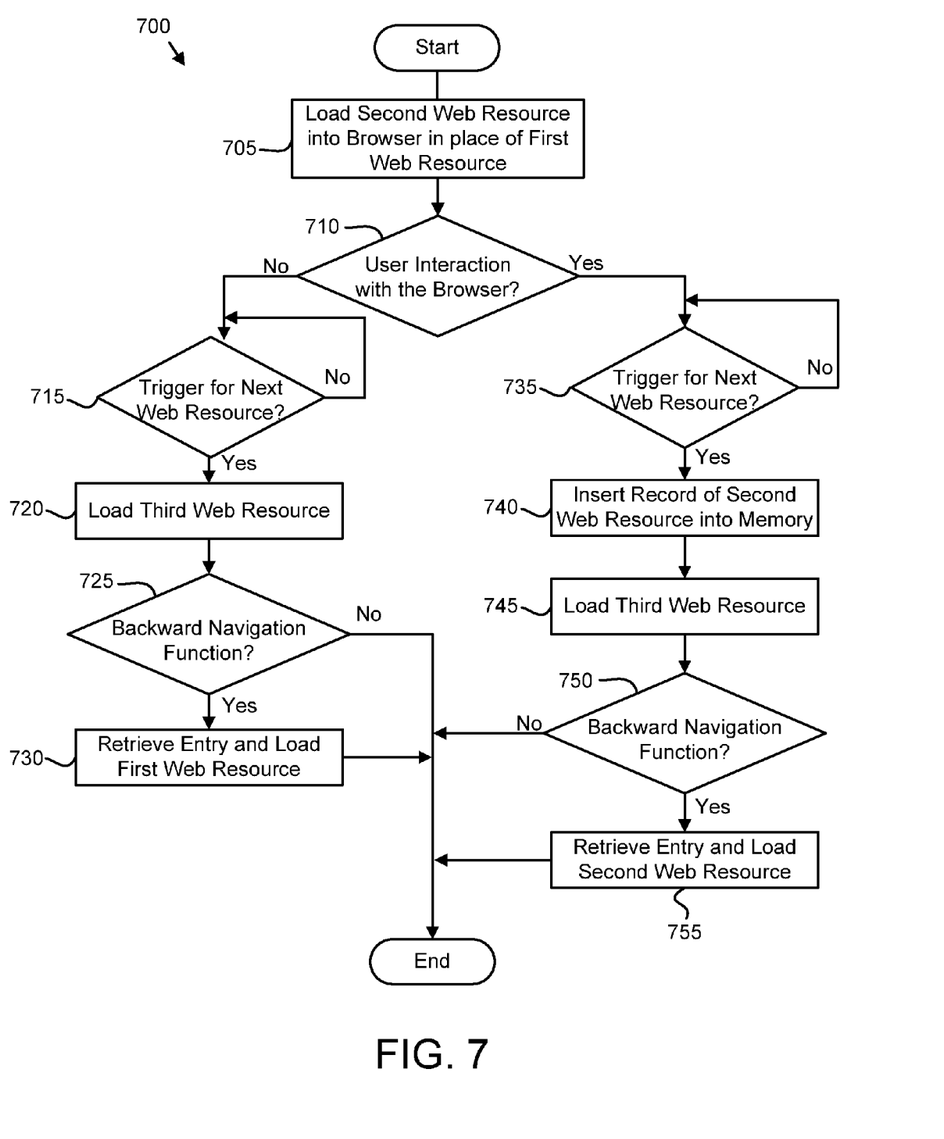
FIG. 7 is a schematic flow chart diagram illustrating another embodiment of a method for inserting user targeted

FIG. 7 illustrates another embodiment of a method 700 for inserting user targeted web resources into browser navigation memory 325. The method 700 assumes that a record of a first web resource 215 exists in navigation memory 325 for a web browser 225. The method 700 begins and the web resource loading module 305 loads 705 a second web resource 215 into a web browser 225 in place of a first web resource 215. The determination module 505 determines 710 whether there is a user interaction with the web browser 225 while the second web resource 215 is loaded in the web browser 225. If the determination module 505 determines 710 that there is no interaction with the web browser 225, the web resource loading module 305 monitors 715 for a trigger to load a next web resource 215. If the web resource loading module 305 detects 715 a trigger for the next web resource 215, the web resource loading module 305 loads 720 a third web resource 215. If the navigation module 310 does not detect 725 a backward navigation function, the method 700 ends.

Otherwise, if the navigation module 310 detects 725 the backward navigation function, the web resource loading module 305 retrieves the entry in the navigation memory 325 associated with the backward navigation function which indicates the first web resource 215 and the web resource loading module 305 loads 730 the first web resource 215. Then the method 700 ends. The first web resource 215 is loaded and not the second web resource 215 because a record of the second web resource 215 was not added into navigation memory 325.

Returning to step 715, if the determination module 505 determines 710 that there is an interaction with the web browser 225, the web resource loading module 305 monitors 735 for a trigger for a next web resource 215. In one embodiment, the interaction with the web browser 225 is the trigger for loading a next web resource 215. If the web resource loading module 305 detects 735 a trigger for the next web resource 215, the insertion module 510 inserts 740 a record of the second web resource 215 into navigation memory 325. The web resource loading module 305 then loads 745 a third web resource 215 into navigation memory 325. If the navigation module 310 does not detect 750 a backward navigation function, the method 700 ends. Otherwise, if the navigation module 310 detects 750 the backward navigation function, the web resource loading module 305 retrieves the record in the navigation memory 325 associated with the backward navigation function which indicates the second web resource 215 and the web resource loading module 305 loads 755 the second web resource 215. Then the method 700 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a storage device storing machine-readable code;
a processor executing the machine-readable code, the machine-readable code comprising:
a determination module determining that a web resource loaded in a web browser is a user targeted web resource in response to detecting a user interaction with the web resource while the web resource is loaded in the web browser after the web resource has been loaded in the web browser for a predetermined period of time;
the determination module determining that the web resource in the web browser is not a user targeted web resource in response to the web resource comprising a web resources selected from the group consisting of a Uniform Resource Locator ("URL") redirect and a pop-up advertisement;

an insertion module inserting a record of the web resource into navigation memory of the web browser in response to the determination module determining that the web resource is a user targeted web resource; and the insertion module skipping inserting a record of the web resource into the navigation memory in response to the determination module determining the web resource is not a user targeted web resource, wherein the web browser returns to a previous web resource in response to a backward navigation function as a result of the web resource that is not a user targeted web resource being absent from the navigation memory, and the previous web resource is a user targeted web resource.

2. The apparatus of claim 1, wherein the web browser loads a next web resource in response to the user interaction.

3. The apparatus of claim 2, wherein the machine-readable code further comprises a detection module detecting the web browser load the next web resource, wherein the insertion module inserts the record of the web resource into navigation memory of the web browser in response to the detection module detecting the web browser load the next web resource.

4. The apparatus of claim 1, wherein the user interaction comprises a selection of a URL appearing on the web resource.

5. A method comprising:

determining that a web resource is a user-targeted web resource loaded in a web browser in response to detecting a user interaction with the web resource while the web resource is loaded in the web browser after the web resource has been loaded in the web browser for a predetermined period of time;

determining that the web resource in the web browser is not a user targeted web resource in response to the web resource comprising a web resources selected from the group consisting of a Uniform Resource Locator ("URL") redirect and a pop-up advertisement;

inserting a record of the web resource into navigation memory of the web browser in response to determining that the web resource is a user-targeted web resource; and skipping insertion of a record of the web resource into the navigation memory in response to the determination module determining the web resource is not a user targeted web resource, wherein the web browser returns to a previous web resource in response to a backward navigation function as a result of the web resource that is not a user targeted web resource being absent from the navigation memory, and the previous web resource is a user targeted web resource.

6. The method of claim 5, further comprising detecting the web browser load a next web resource, wherein inserting the record of the web resource into navigation memory of the web browser occurs in response to detecting the web browser load the next web resource.

7. The method of claim 6, wherein the user interaction comprises a selection of a URL appearing on the web resource.

8. A computer program product comprising a storage device storing machine readable code executed by a processor to perform the operations of:

determining that a web resource is a user-targeted web resource loaded in a web browser in response to detecting a user interaction with the web resource while the web resource is loaded in the web browser after the web resource has been loaded in the web browser for a predetermined period of time;

determining that the web resource in the web browser is not a user targeted web resource in response to the web resource comprising a web resources selected from the group consisting of a Uniform Resource Locator ("URL") redirect and a pop-up advertisement;

inserting a record of the web resource into navigation memory of the web browser in response to determining that the web resource is a user-targeted web resource; and skipping insertion of a record of the web resource into the navigation memory in response to the determination module determining the web resource is not a user targeted web resource, wherein the web browser returns to a previous web resource in response to a backward navigation function as a result of the web resource that is not a user targeted web resource being absent from the navigation memory, and the previous web resource is a user targeted web resource.

9. The computer program product of claim 8, further comprising detecting the web browser load a next web resource, wherein inserting the record of the web resource into navigation memory of the web browser occurs in response to detecting the web browser load the next web resource.

10. The computer program product of claim 9, wherein the user interaction comprises a selection of a URL appearing on the web resource.

* * * * *